US008880660B2

(12) United States Patent
Miyazawa et al.

(10) Patent No.: US 8,880,660 B2
(45) Date of Patent: Nov. 4, 2014

(54) INFORMATION-PROCESSING DEVICE, COMMUNICATION SYSTEM, COMPUTER READABLE MEDIUM, AND INFORMATION-PROCESSING METHOD (75) Inventors: Yukou Miyazawa, Tokyo (JP); Takahiro Ohori, Tokyo (JP); Kazuya Anzawa, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 945 days.

(21) Appl. No.: 12/944,948

(22) Filed: Nov. 12, 2010

(65) Prior Publication Data
US 2011/0113340 A1    May 12, 2011

(30) Foreign Application Priority Data

Nov. 12, 2009  (JP) ................................. 2009-258851

(51) Int. Cl.
G06F 15/177    (2006.01)
H04W 4/00      (2009.01)
G06F 9/445     (2006.01)

(52) U.S. Cl.
CPC ................................... G06F 9/445 (2013.01)
USPC ......................................... 709/221; 455/466

(58) Field of Classification Search
USPC ......................................... 358/1.15; 709/221
See application file for complete search history.

(56) References Cited

U.S. PATENT DOCUMENTS 6,988,662 B2   1/2006  Russell et al.
8,385,950 B1*  2/2013  Wagner et al. ................. 455/466
2003/0179405 A1*  9/2003  Seto ............................. 358/1.15
2004/0107272 A1*  6/2004  Manukyan ..................... 709/221
2005/0155012 A1  7/2005  Tayama et al.
2007/0045421 A1  3/2007  Liu

FOREIGN PATENT DOCUMENTS

| CN | 1987888      | 6/2007  |
| CN | 101174205    | 5/2008  |
| JP | 07-319711    | 12/1995 |
| JP | 2002-287974  | 10/2002 |
| JP | 2004-206595  | 7/2004  |
| JP | 2006-318114  | 11/2006 |
| JP | 2007-087142  | 4/2007  |

(Continued)

OTHER PUBLICATIONS

Office Action with English Translation, Mailing Date—Dec. 20, 2011, issued in conjunction with Korean Patent Application No. 10-2010-0112133.

(Continued)

Primary Examiner — David Lazaro
Assistant Examiner — Mahran Abu Roumi
(74) Attorney, Agent, or Firm — MKG, LLC (57) ABSTRACT An information-processing device comprises: a storage unit that stores first location data for identifying a server on a network; a conversion unit that converts a source code into an object code; a transmitting unit that, if an object code to be generated by the conversion unit is directed to a mobile communication terminal, transmits a request to upload a file, including an object code generated by the conversion unit, to the server identified by the first location data stored in the storage unit over the network; a receiving unit that receives a response to the request transmitted from the server; and a control unit that, if the receiving unit receives the response, causes a display unit that displays information to display a screen showing second location data indicating a location of the file on the network.

9 Claims, 6 Drawing Sheets

(56) References Cited

FOREIGN PATENT DOCUMENTS

| JP | 2008-107865 | 5/2008 |
| JP | 2008-206041 | 9/2008 |
| JP | 2009-95017 | 4/2009 |
| KR | 2008-0062445 | 7/2008 |
| WO | 0124051 A1 | 4/2001 |
| WO | 03-069470 A1 | 8/2003 |

OTHER PUBLICATIONS

Office Action for corresponding Chinese Application No. 201010546435.8 issued Mar. 21, 2013.

European Examination Report for EP Application Serial No. 10 190 453.0-1243, dated Aug. 10, 2011.

Japanese Office Action for JP Patent Application No. 2009-258851 dated Oct. 25, 2011, with English translation.

Tetsu Higashi, "New Method of Creating i-Appli using SpicyDogBuilder2", English abstract.

Final Office Action issued in Korean Patent Application No. 10-2010-0112133 dated Aug. 27, 2012.

Final Office Action issued in Korean Patent Application No. 10-2010-0112133 dated Dec. 6, 2012.

European Search Report for EP10190453.0-1243/2323024.

Korean Board of Patent Appeals, Decision on Appeal; Trial No. 2013WON1686, for Korean Patent Application No. 2010-0112133, dated May 22, 2014; with English translation.

Chinese Second Office Action for corresponding Application No. 201010546435.8, date of issuance Oct. 11, 2013.

* cited by examiner

| APPLICATION NAME | launcher |
| --- | --- |
| UPLOAD SERVER | Http://aaa.bbb.ccc.com/iappli/ |
| USER | yamada |
| PASSWORD | ********* |
| PROXY SERVER | 192.168.239.15 |
| PROXY PORT | 8080 |

CANCEL  OK

| APPLICATION NAME= launcher | | |
| --- | --- | --- |
| VERSION | FILE NAME | FILE NAME |
| 1 | launcher1 | 8/25 20:01 |
| 2 | launcher2 | 8/25 20:25 |
| 3 | launcher3 | 8/25 20:40 |

INFORMATION-PROCESSING DEVICE, COMMUNICATION SYSTEM, COMPUTER READABLE MEDIUM, AND INFORMATION-PROCESSING METHOD

CROSS-REFERENCE TO RELATED APPLICATIONS

This application is based on and claims priority under 35 U.S.C. 119 from Japanese Patent Application No. 2009-258851, which was filed on Nov. 12, 2009.

FIELD OF THE INVENTION

The present invention relates to a technique for developing a program to be executed in a mobile communication terminal.

BACKGROUND OF THE INVENTION

A program such as a Java (registered trademark) application program that runs on a mobile communication terminal is known. A mobile communication terminal such as a mobile phone is likely to have a lower-capacity processor and storage device as compared with a general-purpose computer such as a personal computer. In view of the fact, a procedure is conducted by which an application program is developed in a general-purpose computer, the developed program is transmitted to a mobile communication terminal via a server, and an operation check of the program is performed in the mobile communication terminal. In connection with the procedure, JP 2009-95017 A discloses a technique for uploading image data from a mobile phone to a server. Specifically, JP 2009-95017 A discloses uploading image data, and storing data on a URL in a RAM, which indicates a storage location of the image data.

SUMMARY OF THE INVENTION

The present invention provides a technique for enabling a mobile communication terminal to obtain a program developed in an information-processing device and uploaded to a server.

An information-processing device according to an aspect of the present invention comprises: a storage unit that stores first location data for identifying a server on a network; a conversion unit that converts a source code into an object code; a transmitting unit that, if an object code to be generated by the conversion unit is directed to a mobile communication terminal, transmits a request to upload a file, including an object code generated by the conversion unit, to the server identified by the first location data stored in the storage unit over the network; a receiving unit that receives a response to the request transmitted from the server; and a control unit that, if the receiving unit receives the response, causes a display unit that displays information to display a screen showing second location data indicating a location of the file on the network.

According to the information-processing device, a mobile communication terminal is able to obtain a program easily that has been uploaded to a server, as compared with a configuration in which a control unit is not provided for causing a display unit to display a screen showing second location data.

In a preferred aspect, the second location data may include a character string identifying an ordinal number that is determined on a created date of the file, and the screen may include a first part that shows the second location data corresponding to the file and a second part that shows an ordinal number corresponding to another file.

According to the information-processing device, it is possible to obtain different files easily, as compared with a case in which a first part and a second part are not provided.

In another preferred aspect, the conversion unit may convert a source code into plural object codes, which correspond to different models of the mobile communication terminal, the request may be a request to upload plural files corresponding to plural object codes, the second location data may include a character string identifying a model of the mobile communication terminal, and the screen may include a first part that shows the second location data corresponding to the file and a second part that shows the model corresponding to another file.

According to the information-processing device, it is possible to easily obtain different files corresponding to different models, as compared with a case in which a first part and a second part are not provided.

In another preferred aspect, the second part may show an image of plural tabs that correspond to different files, the information-processing device may comprise an accepting unit that accepts an instruction to select one from among the plural tabs, and the control unit may cause the display unit to display a screen that includes a first part that shows second location data corresponding to a file corresponding to a tab selected by an instruction accepted by the accepting unit, and a second part that shows an image of tabs corresponding to files other than the file corresponding to the selected tab.

According to the information-processing device, it is possible to change screens, as compared with a case in which an image of tabs is not displayed.

In another preferred aspect, the storage unit may store an identifier that shows whether an object code is directed to the mobile communication terminal, the information-processing device may comprise a determination unit that determines whether an object code to be generated by the conversion unit is directed to the mobile communication terminal on the basis of the identifier retrieved from the storage unit, and if the determination unit determines that an object code to be generated by the conversion unit is directed to the mobile communication terminal, the transmitting unit may transmit the request.

According to the information-processing device, if an object code is directed to a mobile communication terminal, a procedure directed to a mobile communication terminal is carried out.

A communication system according to another aspect of the present invention comprises: a server; an information-processing device connected to the server over a network; and a mobile communication terminal connected to the server over the network, wherein: the information-processing device comprises: a first storage unit that stores first location data for identifying a server on the network; a conversion unit that converts a source code into an object code; and a first transmitting unit that, if an object code to be generated by the conversion unit is directed to a mobile communication terminal, transmits a request to upload a file, including an object code generated by the conversion unit, to the server identified by the first location data stored in the first storage unit over the network, the server comprises: a first receiving unit that receives a file transmitted from the information-processing device; a naming unit that gives a file name to a file received by the first receiving unit; a second storage unit that stores a file to which a file name has been given by the naming unit; and a second transmitting unit that, after the file is stored in the second storage unit, transmits a response to the request, including second location data indicating a location of the file on the network, to the information-processing device, the information-processing device further comprises: a second receiving unit that receives a response to the request, transmitted from the server; and a control unit that, if the second receiving unit receives the response, causes a display unit that displays information to display a screen showing the second location data, the mobile communication terminal comprises: a reading unit that reads the screen displayed on the display unit; an obtaining unit that obtains the file, using the second location data shown on the screen, read by the reading unit; and an executing unit that executes an object code included in the file obtained by the obtaining unit.

According to the communication system, a mobile communication terminal is able to obtain a program easily that has been uploaded to a server, as compared with a configuration in which a control unit is not provided for causing a display unit to display a screen showing second location data.

In a preferred aspect, the server may comprise a generating unit that generates data of an image representing the second location data, on the basis of the file name, and the second transmitting unit may transmit the data generated by the generating unit to the mobile communication terminal.

According to the communication system, it is possible to easily generate data of an image representing second location data, as compared with a configuration in which a generating unit is not provided for generating data of an image representing second location data, on the basis of a file name.

A computer readable medium according to another aspect of the present invention stores a program for causing an information-processing device comprising a storage unit that stores first location data for identifying a server on a network, and a control unit that controls a display unit that displays information, to: convert a source code into an object code; if an object code to be generated by conversion is directed to a mobile communication terminal, transmit a request to upload a file, including an object code generated by conversion, to the server identified by the first location data stored in the storage unit over the network; receive a response to the request transmitted from the server; and after the response is received, cause the display unit to display a screen showing second location data indicating a location of the file on the network.

According to the computer readable medium, a mobile communication terminal is able to obtain a program easily that has been uploaded to a server, as compared with a configuration in which a control unit is not provided for causing a display unit to display a screen showing second location data.

An information-processing method according to another aspect of the present invention, which is carried out by an information-processing device comprising a storage unit that stores first location data for identifying a server on a network, and a control unit that controls a display unit that displays information, comprises: converting a source code into an object code; if an object code to be generated by conversion is directed to a mobile communication terminal, transmitting a request to upload a file, including an object code generated by conversion, to the server identified by the first location data stored in the storage unit over the network; receiving a response to the request transmitted from the server; and after the response is received, causing the display unit to display a screen showing second location data indicating a location of the file on the network.

According to the method, a mobile communication terminal is able to obtain a program easily that has been uploaded to a server, as compared with a configuration in which a control unit is not provided for causing a display unit to display a screen showing second location data.

DETAILED DESCRIPTION

1. Configuration

Figure 1:
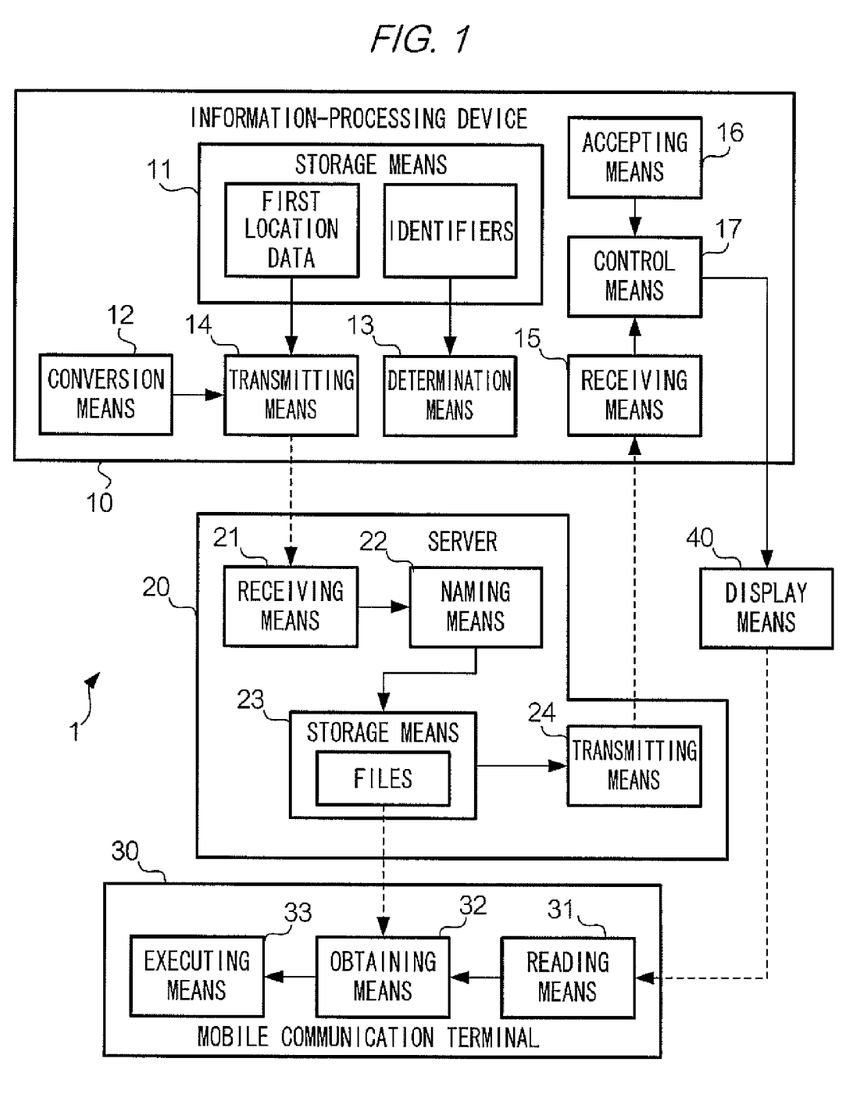
FIG. 1 is a diagram showing a functional configuration of communication system 1 according to an embodiment.

FIG. 1 is a diagram showing a functional configuration of communication system 1 according to an embodiment. Communication system 1 comprises information-processing device 10, server 20, and mobile communication terminal 30. Server 20 is connected to information-processing device 10 and mobile communication terminal 30 via a network (not shown) such as the Internet or a mobile communication network. Communication system 1 is a system for developing an application program to be executed in mobile communication terminal 30. Specifically, in communication system 1, a program developed by information-processing device 10 is uploaded to server 20, the uploaded program is downloaded to mobile communication terminal 30, and a test execution of the downloaded program is performed in mobile communication terminal 30. A developer modifies the program on the basis of the result of the test execution conducted in mobile communication terminal 30. A cycle of uploading, test execution, and program modification is repeated until a program is completed.

Information-processing device 10 is a device for executing a program that is used for developing an application program to be executed in mobile communication terminal 30. Information-processing device 10 may be a personal computer. Information-processing device 10 comprises storage means 11, conversion means 12, determination means 13, transmitting means 14, receiving means 15, accepting means 16, and control means 17. Storage means 11 stores first location data such as a URL (Uniform Resource Locator), which is used for identifying server 20 in a network. Storage means 11 also stores identifiers that indicate whether a program to be developed is directed to mobile communication terminal 30. Conversion means 12 converts (compiles) a source code of a program to be developed, into an object code. Determination means 13 determines whether an object code generated by conversion means 12 is directed to mobile communication terminal 30, on the basis of an identifier retrieved from storage means 11. Transmitting means 14 transmits a request to upload a file to server 20, via a network, if an object code generated by conversion means 12 is directed to mobile communication terminal 30. The file includes the object code that has been generated by conversion means 12. The server to which the request is sent is identified on the basis of location data stored in storage means 11. Server 20 transmits a response to the request, as described later. Receiving means 15 receives a response transmitted from server 20. Control means 17 causes display means 40 to display a screen showing second location data when receiving means 15 receives a response. Second location data may be data such as a URL, which indicates a location of a file in a network.

Server 20 stores a file uploaded from information-processing device 10, and also transmits a stored file in response to a request from mobile communication terminal 30. Server 20 comprises receiving means 21, naming means 22, storage means 23, and transmitting means 24. Receiving means 21 receives a file transmitted from information-processing device 10. Naming means 22 gives a file name to a file received by receiving means 21. Storage means 23 stores files to which a file name has been given. Transmitting means 24 sends a response to a request to information-processing device 10 when a file is stored in storage means 23. The request includes second location data that indicates a location of a file in a network.

Mobile communication terminal 30 is a device that is capable of executing an application program. Mobile communication terminal 30 may be a mobile phone. Mobile communication terminal 30 comprises reading means 31, obtaining means 32, and executing means 33. Reading means 31 reads a screen displayed on display means 40. Obtaining means 32 obtains a file, using second location data shown in a screen read by reading means 31. Executing means 33 executes an object code included in a file obtained by obtaining means 32.

In the present embodiment, second location data includes a character string that identifies an ordinal number such as a version number of a program, which is determined on the basis of a created date and time of a program. The screen shown on display means 40 includes a first part that indicates a second location data corresponding to a file and a second part that indicates numbers corresponding to other files. The second part includes an image of plural tabs that correspond to different files. Accepting means 16 accepts an instruction to select a tab from among plural tabs. Control means 17 causes display means 40 to display a screen including second location data in a first part of the screen, which corresponds to a file corresponding to a tab that has been selected by an instruction accepted by accepting means 16. The screen also includes an image of plural tabs in a second part of the screen, which tabs correspond to files other than the file corresponding to the selected tab.

Figure 2:
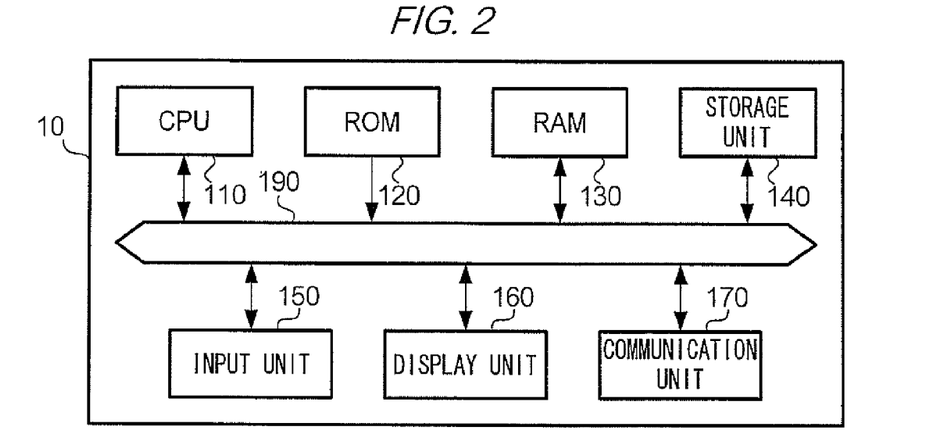
FIG. 2 is a diagram showing a hardware configuration of information-processing device 10.

FIG. 2 is a diagram showing a hardware configuration of information-processing device 10. Information-processing device 10 comprises CPU (Central Processing Unit) 110, ROM (Read Only Memory) 120, RAM (Random Access Memory) 130, storage unit 140, input unit 150, display unit 160, and communication unit 170. CPU 110 is a control device for controlling components of information-processing device 10. ROM 120 is a storage device that stores basic programs and data that are used for controlling operations of information-processing device 10. RAM 130 is a storage device that functions as a work area when CPU 110 executes a program. Storage unit 140 includes a storage device for storing application programs and data, which may be a flash memory or an HDD (Hard Disk Drive). Input unit 150 includes a device for inputting an instruction or data to information-processing device 10, which may be a keyboard or a mouse. Display unit 160 includes a display device that displays information under control of CPU 110, which may be a liquid crystal display or an organic EL display. Communication unit 170 performs data communication via a network. Bus 190 is a transmission line in which commands and data are transmitted. The foregoing elements are connected via bus 190.

In the present embodiment, storage unit 140 stores a program for developing an application program to be executed in mobile communication terminal 30 (hereinafter referred to as "development program"). When the development program is executed by CPU 110 so that the CPU cooperates with other hardware elements, the functions shown in FIG. 1 are realized. CPU 110 running the development program is an example of conversion means 12, determination means 13, accepting means 16, and control means 17. Communication unit 170 that operates under control of CPU 110 is an example of transmitting means 14 and receiving means 15. ROM 120, RAM 130, and storage unit 140 are examples of storage means 11.

Figure 3:
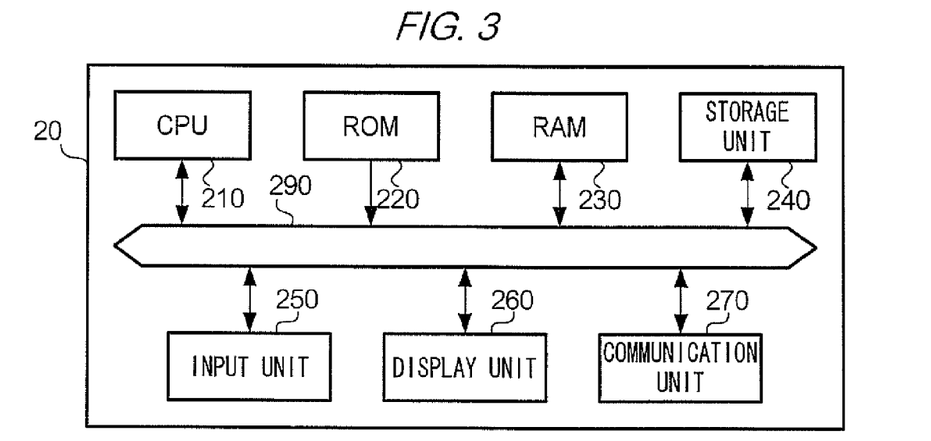
FIG. 3 is a diagram showing a hardware configuration of server 20.

FIG. 3 is a diagram showing a hardware configuration of server 20. Server 20 comprises CPU 210, ROM 220, RAM 230, storage unit 240, input unit 250, display unit 260, and communication unit 270. CPU 210 is a control device for controlling components of server 20. ROM 220 is a storage device that stores basic programs and data that are used for controlling operations of server 20. RAM 230 is a storage device that functions as a work area when CPU 210 executes a program. Storage unit 240 includes a storage device for storing application programs and data, which may be a flash memory or an HDD (Hard Disk Drive). Input unit 250 includes a device for inputting an instruction or data to server 20, which may be a keyboard or a mouse. Display unit 260 includes a display device that displays information under control of CPU 210, which may be a liquid crystal display or an organic EL display. Communication unit 270 performs data communication via a network. Bus 290 is a transmission line in which commands and data are transmitted. The foregoing elements are connected via bus 290.

In the present embodiment, storage unit 240 stores a program for enabling server 20 to function as a server that stores and transmits a file (hereinafter referred to as "server program"). When the server program is executed by CPU 210 so that the CPU cooperates with other hardware elements, the functions shown in FIG. 1 are realized. CPU 210 running the server program is an example of naming means 22. Communication unit 270 that operates under control of CPU 210 is an example of receiving means 21 and transmitting means 24. ROM 220, RAM 230, and storage unit 240 are examples of storage means 23.

Figure 4:
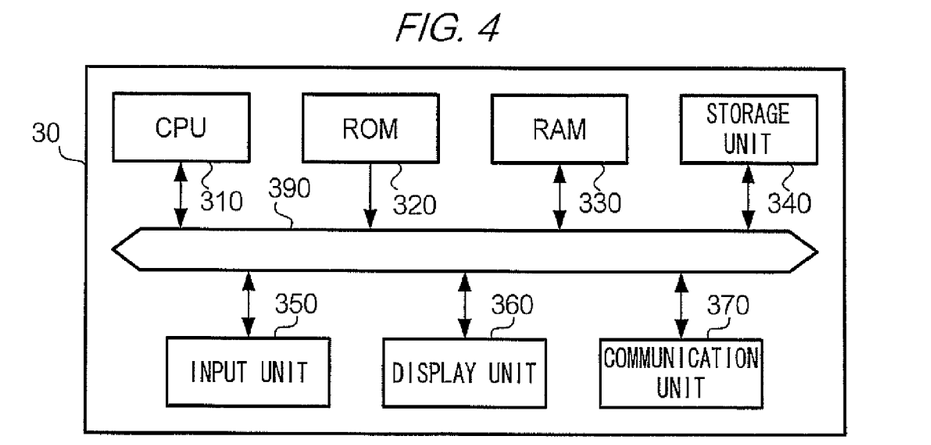
FIG. 4 is a diagram showing a hardware configuration of mobile communication terminal 30.

FIG. 4 is a diagram showing a hardware configuration of mobile communication terminal 30. Mobile communication terminal 30 comprises CPU 310, ROM 320, RAM 330, storage unit 340, input unit 350, display unit 360, and communication unit 370. CPU 310 is a control device for controlling components of mobile communication terminal 30. ROM 320 is a storage device that stores basic programs and data that are used for controlling operations of mobile communication terminal 30. RAM 330 is a storage device that functions as a work area when CPU 310 executes a program. Storage unit 340 includes a storage device for storing application programs and data, which may be a flash memory or an HDD (Hard Disk Drive). Input unit 350 includes a device for inputting an instruction or data to mobile communication terminal 30, which may be a keypad or a touch panel. Input unit 350 also includes a camera for capturing an image. Display unit 360 includes a display device that displays information under control of CPU 310, which may be a liquid crystal display or an organic EL display. Communication unit 370 performs data communication via a network. Bus 390 is a transmission line in which commands and data are transmitted. The foregoing elements are connected via bus 390.

In the present embodiment, storage unit 340 stores pieces of software for providing an execution environment in which an application program is executed (hereinafter referred to as "Java Runtime Environment"). An application program is described in the Java programming language. The Java Runtime Environment includes a class library, a JVM (Java Virtual Machine), and a JAM (Java Application Manager). The class library is a file consisting of a combination of program modules (classes) that have a particular function. The JVM has a function of interpreting and executing a bite code (object code) provided as a Java application program. The JAM has a function of managing operations related to a Java application program such as downloading, installation, start-up, and termination. When CPU 310 executes the Java Runtime Environment so that the CPU cooperates with other hardware elements, the functions shown in FIG. 1 are realized. CPU 310 running the Java Runtime Environment is an example of obtaining means 32 and executing means 33. Storage unit 340 also stores a program for interpreting an image captured by the camera to extract a URL (hereinafter referred to as "reading program"), a program for browsing a web page (hereinafter referred to as "browser"), and a program for exchanging an email (hereinafter referred to as "mailer"). CPU running the reading program and the camera are examples of reading means 31.

2. Operation

Figure 5:
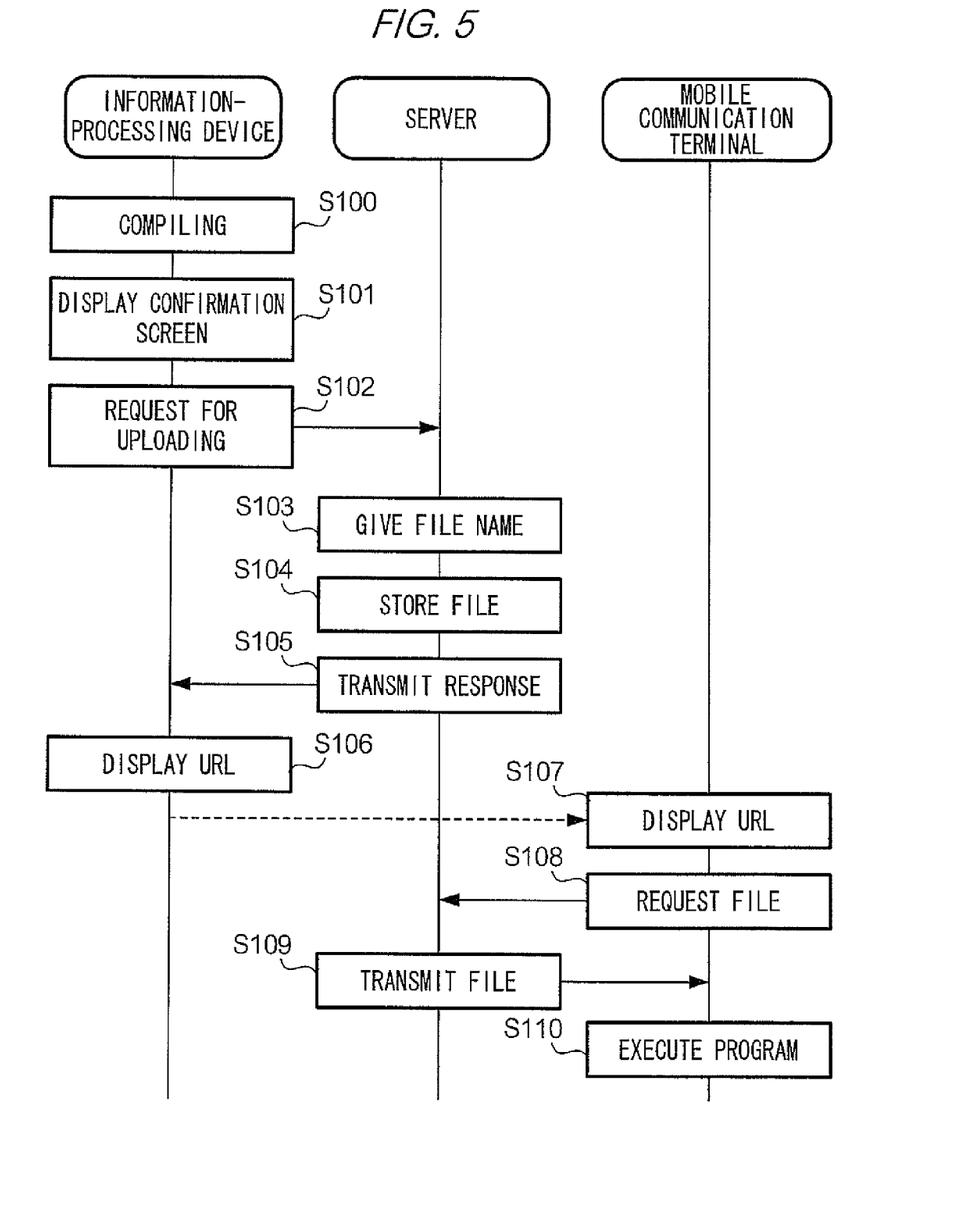
FIG. 5 is a flowchart showing an operation of communication system 1.

FIG. 5 is a flowchart showing an operation of communication system 1. In the following description, software such as a development program, a JAM, and a reading program is described as a performing entity of processing; however, the description is intended to mean that a CPU running software carries out an operation in cooperation with hardware elements.

In step S100, a development program of information-processing device 10 compiles a source code to generate an object code. A source code is a program code described in a programming language. An object code is a program code described in a machine language executable by a computer. A source code is generated by a developer.

Figure 6:
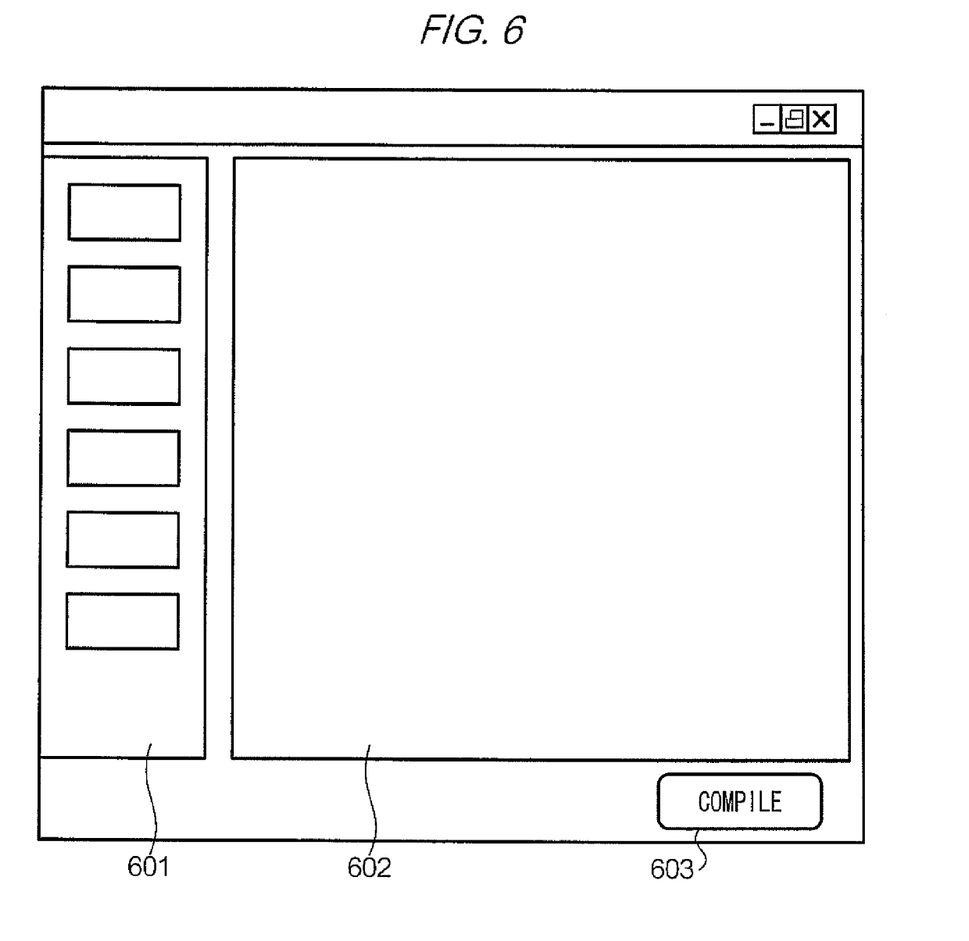
FIG. 6 is a diagram showing an example of a screen displayed by a development program.

FIG. 6 is a diagram showing an example of a screen displayed by the developing program. The development program employs a GUI (Graphical User Interface). The screen has window 601, window 602, and button 603. Window 601 is a window in which elements such as an icon, a button, or an input box that are used for writing a program, are displayed. Window 602 is a window in which a screen representing display unit 360 of mobile communication terminal 30 is displayed. A developer drags an element displayed in window 601 to arrange it in window 602. A developer also specifies an operation to an element arranged in window 602. By the operations, a source code is automatically generated, which describes screens to be displayed in mobile communication terminal 30 and operations corresponding to the screens. If a developer clicks button 603, the development program starts compiling the source code.

In the development program, a program to be developed is managed in a unit of a project. A project is a collection of data such as a source file, a library, or a header file, which are used for developing a program. In the present embodiment, a project includes an identifier of a platform to which a generated object code is directed. A platform is a basic part of a computer such as an operating system or hardware. In the present embodiment, a platform includes a personal computer and a mobile phone. A project is stored in storage unit 140.

In the flowchart shown in FIG. 5, if a platform to which an object code to be generated is directed is a mobile phone, and the compiling is completed, the development program displays a screen for confirming necessity of uploading a file (step S101). The file includes the object code generated as a result of the compiling. The operation of uploading a file needs a variety of parameters. The screen also displays the parameters.

Figure 7:
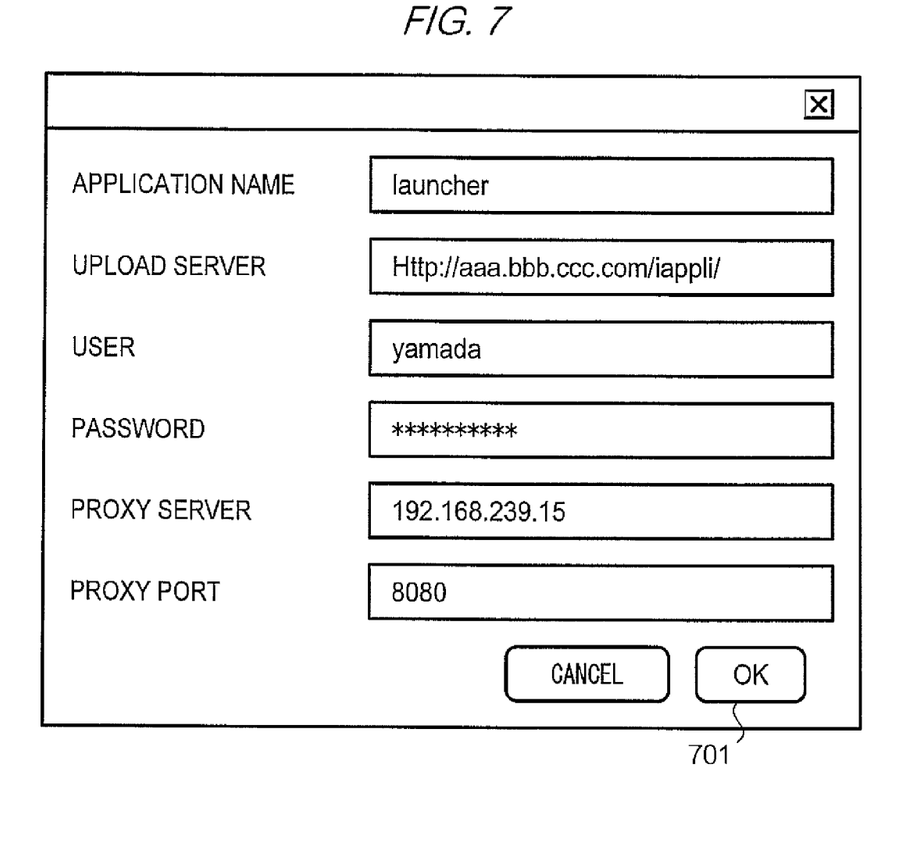
FIG. 7 is a diagram showing an example of a confirmation screen for confirming necessity of uploading.

FIG. 7 is a diagram showing an example of a confirmation screen for confirming necessity of uploading. In the present example, the confirmation screen shows parameters of an "application name," an "upload server," a "user," a "password," a "proxy server," and a "proxy port," and button 701. The parameter "application name" is an identifier of a program to be developed. The parameter "upload server" is data showing a location in a network of a server that is to store a file. In the present example, the data is a URL. The parameter "user" is an identifier for identifying a developer in server 20. The parameter "password" is a password used for authentication so as to obtain access to server 20. The parameter "proxy server" is data for identifying a proxy server that is used for uploading a file. In the present example, the data is an IP address. The parameter "proxy port" is a port number for identifying a communication destination in a proxy server. Values of the parameters are stored in storage unit 140 before the confirmation screen shown in FIG. 7 is displayed. Among the parameters, values of the parameters "upload server," "proxy server," and "proxy port" are included in the development program as internal data. Accordingly, values of the parameters are set by the development program even if a user does not input the values. As to the parameters "user" and "password," a screen for prompting a user to input values of the parameters is displayed when the development program is initially started. A developer inputs values of the parameters following instruction on the screen. The development program stores the input values in storage unit 140. When the development program is started a second time or after it retrieves values of the parameters, from storage unit 140. If a developer clicks button 701, the development program uploads a file using the parameters displayed on the confirmation screen. The details of the uploading of a file are as follows.

In the flowchart shown in FIG. 5, if a developer clicks button 701 on the confirmation screen, the development program sends a request for uploading a file to server 20 (step S102). The server to which the request is sent is determined by the parameter shown on the confirmation screen in FIG. 7. The request includes parameters "application name," "user," and "password," and a file. The server program of server 20 receives the request. On receipt of the request, the server program of server 20 carries out an operation of authenticating a developer, using the parameters "user" and "password."

If a developer is authenticated, the server program gives a file name to the file included in the request (the newly uploaded file) (step S103). The server program has an algorithm for giving a file name to a received file, and the server program gives a file name in accordance with the algorithm. The details are as follows. The server program obtains a value of the parameter "application name" included in the received request. In an example, a value "launcher" is obtained as an "application name." The server program also obtains a time stamp of the file included in the request. A time stamp is data showing a time at which a file has been generated (namely, a time at which compiling has been completed). In the following description, it is assumed that the obtained time stamp indicates "8/25 20:55." The server program searches storage unit 240 for a history related to a file whose "application name" is "launcher." A history of a file is a change log of a program. Specifically, a history includes data on an application name, versions of a program identified by the application name, and time stamps of files corresponding to the versions.

Figure 8:
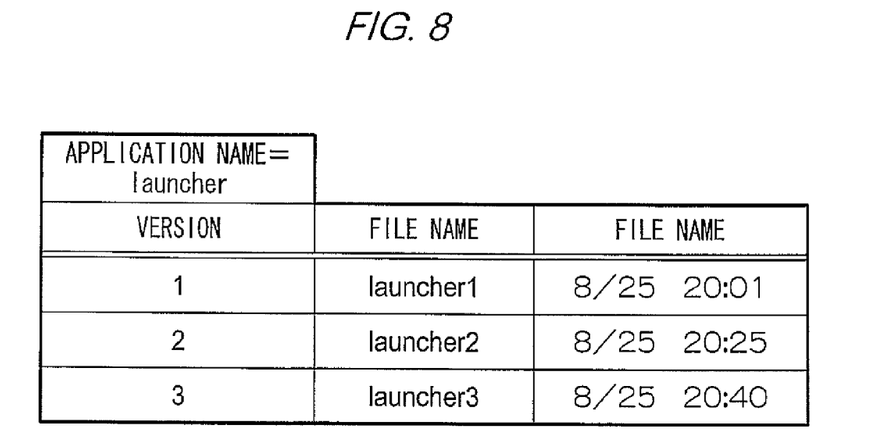
FIG. 8 is a diagram showing an example of a file history.

FIG. 8 is a diagram showing an example of a file history. In the example, it is indicated that with regard to a file whose "application name" is "launcher," three files of versions 1 to 3 have been uploaded. Time stamps of versions 1 to 3 indicate "8/25 20:01," "8/25 20:25," and "8/25 20:40," respectively.

If the server program finds a history related to a file whose "application name" is "launcher," the program compares the obtained time stamp with time stamps recorded in the history. The server program determines a version of the newly uploaded file on the basis of the comparison of time stamps. For example, if a time indicated by the obtained time stamp is later than times indicated by all time stamps recorded in the history, the server program adds one to a number of the latest version recorded in the history, and uses the obtained value as a version number of the newly uploaded file. Alternatively, if a time indicated by the obtained time stamp falls between times indicated by time stamps of two files recorded in the history, the server program uses an intermediate value between the numbers of the versions of the two files as a version number of the newly uploaded file. For example, if a file has been created between a time at which version 2 has been created and a time at which version 3 has been created, a version number of the file will be "2.5." The server program writes the determined version number in the history. In the example, a time stamp "8/25 20:55" is added in the file history shown in FIG. 8 as a time stamp corresponding to version 4. The server program also stores data on the version of the newly uploaded program in RAM 230. The server program also generates a character string including the value of the parameter "application name" and a character indicating the version of the newly uploaded program, and uses the generated character string as a file name of the newly uploaded file. In the example, a file name "launcher4" is given.

In the flowchart shown in FIG. 5, if a file name is given, the server program stores the file in storage unit 240 (step S104). After storing the file, the server program transmits a response to information-processing device 10, which is the sender of the request (step S105). The response includes a URL and a version value of the newly uploaded file.

Upon receiving the response from server 20, the development program of information-processing device 10 generates data of an image showing the URL and the version of the newly uploaded file on the basis of the URL and version data included in the received response. The development program has a program module (subroutine) for converting a character string indicating a URL into an image (in the present embodiment, an image of a 2-dimensional bar code such as a QR code (registered trademark)), and the program calls the module to generate data of the image. The development program adds to the generated image data, attributes indicating a value of the parameter "application name" and a version. In the present example, it is assumed that storage unit 140 stores data on images corresponding to four files of versions 1 to 4. The development program displays a screen showing the images on display unit 160 (step S106).

Figure 9:
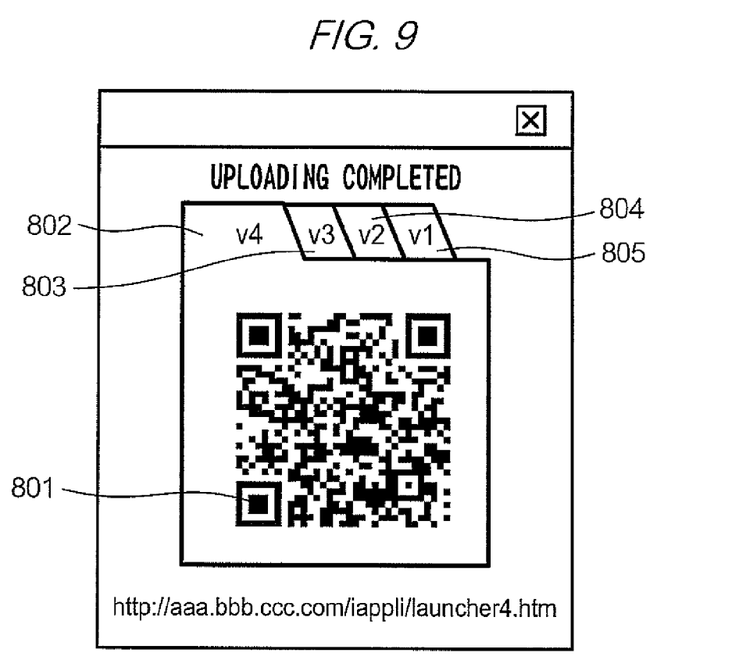
FIG. 9 is a diagram showing an example of a screen displayed.

FIG. 9 is a diagram showing an example of the displayed screen. The screen includes a part that shows an image representing a URL (first part) and a part that shows an image of tabs (second part). The first part shows image 801 of a 2-dimensional bar code such as a QR code, as an image representing a URL. The second part shows an image of plural tabs 802 to 805. Tabs 802 to 805 correspond to files of different versions. Tabs 802 to 805 have an indication of a corresponding version. For example, tab 802 corresponds to a file of version 4, and therefore, the tab has an indication of "v4," which means version 4. Among tabs 802 to 805, one of them is active, and is displayed in the front. Tabs that are not active are displayed behind the active tab. A developer switches an active tab by clicking a tab. The image shown in the first part is an image representing a URL of a file corresponding to an active tab. In the example shown in FIG. 9, a tab corresponding to version 4 is active, and accordingly, an image corresponding to a file of version 4 is shown. In the example shown in FIG. 9, also, a character string representing a URL, "http://aaa.bbb.ccc/iappli/launcher4.htm," is shown below image 801. It is to be noted that a "tab" is an interface including an image (a part to be clicked), which is used for inputting an instruction of switching. A tab may take any shape as long as the tab has such a function.

Figure 10:
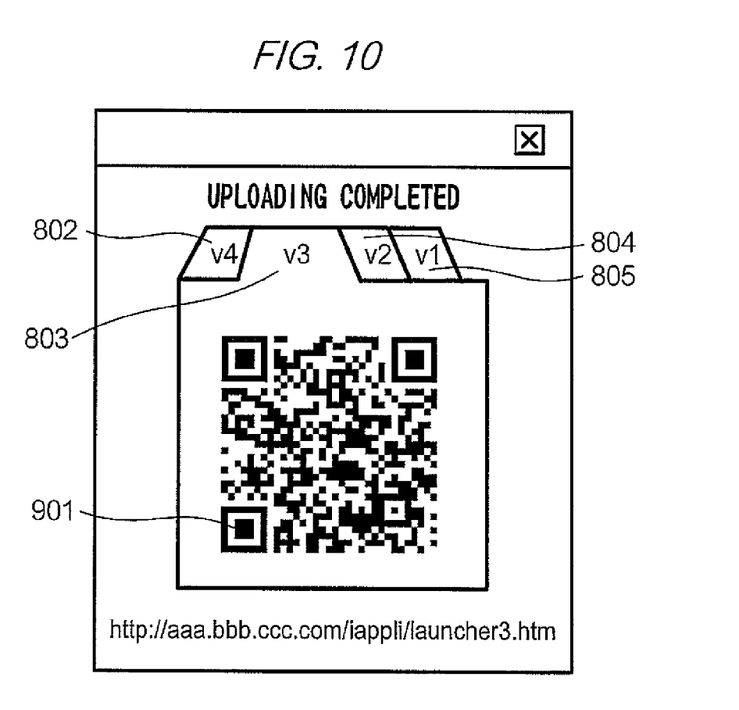
FIG. 10 is a diagram showing another example of a screen displayed.

FIG. 10 is a diagram showing another example of the displayed screen. FIG. 10 shows a screen that is displayed when tab 803 is clicked on the screen shown in FIG. 9. In the screen, tab 803 is active. Image 901 is an image representing a URL of a file of version 3. Using the interface, a developer is able to call and browse an image representing a URL of a file of a desired version.

In the flowchart shown in FIG. 5, at step S107, a developer starts a bar code reader (an example of a reading program) by operating mobile communication terminal 30, and captures an image displayed on display unit 160 (for example, image 801 shown in FIG. 9), using the camera. The bar code reader obtains a URL from a read image. A developer starts a browser by operating mobile communication terminal 30. The browser accesses a server identified by the obtained URL, and requests a file from the server (step S108). On receipt of the request for a file from mobile communication terminal 30, server 20 transmits the file in response to the request (step S109). On receipt of the file, a JAM installs a program and executes the installed program (step S110). As a result, a developer is able to conduct an operation check of the program in a mobile communication terminal to which the program is directed, instead of using an emulator in a personal computer.

It is to be noted that in steps S100 to 102 shown in FIG. 5, if a platform to which an object code to be generated is a personal computer, the development program transmits a request to server 20 after adding a flag to the request, which indicates that the object is directed to a personal computer. In this case, naming and storing of a file are carried out as described in the foregoing; however, a response transmitted from server 20 includes the flag. If the development program of information-processing device 10 receives a response with the flag, the program displays only a character string indicating a URL on a screen shown in FIG. 9, without generating an image of a 2-dimensional bar code.

Also, it is to be noted that in steps 102 to 105 shown in FIG. 5, in a case a developer is not authenticated in server 20 so that a file, uploading of which has been requested, cannot be stored, the server program transmits a response including an error message to information-processing device 10, which is a sender of the request.

In the past, since setting of parameters such as those included in the screen shown in FIG. 7 is sometimes required for uploading a file to a server on a network, a situation can occur in which a person having little knowledge about a network is not able to upload a file easily. Also, since inputting of a character string of a URL is required for downloading an uploaded file to a mobile communication terminal, a situation can occur in which an operation of downloading can be inconvenient. However, according to the present embodiment, it is possible to upload a file easily as compared with a case in which parameters are manually input. Also, according to the present embodiment, it is possible to download a file easily after the file is uploaded, as compared with a case in which a character string of a URL is manually input in a mobile communication terminal. Also, according to the present embodiment, it is possible to obtain a file of an old version easily as compared with a configuration in which images, representing a URL of a file of a different version, cannot be switched using a tab.

3. Other Embodiments

An embodiment of the present invention is not limited to the above one. The present invention may be implemented in a variety of embodiments. Below, some modifications will be described. The two or more modifications described below may be combined with each other.

3-1. Modification 1

Plural tabs shown in FIG. 9 may correspond to different models. A model is a model of mobile communication terminal 30. In the present case, the development program has a function of converting a source code into plural object codes that correspond to a mobile communication terminal 30 of a different model. Data on models for which an object code is generated is stored in storage unit 140. The data is included in the development program as internal data. The data may be rewritten by a developer. After compiling is completed, the development program transmits a request to server 20 to upload plural files simultaneously or sequentially. On receipt of a response from server 20, the development program generates plural images corresponding to plural models, and stores the images in storage unit 140. The development program displays a screen in the example shown in FIG. 9, in which plural tabs having an indication of a model, not a version, are shown. According to the present modification, it is possible to obtain a file for a different model easily as compared with a configuration in which images, representing a URL of a file for a different model, cannot be switched using a tab.

As an alternative, the development program may employ a configuration in which switching of images using tabs are not performed. Namely, the development program may display a screen showing only a single URL.

3-2. Modification 2

Server 20 may transmit data (for example, an email message) including a URL of a file to mobile communication terminal 30, in addition to a response to information-processing device 10. Mobile communication terminal 30 to which the data is transmitted is a mobile communication terminal pre-registered in server 20. Server 20 stores a list of destinations of a file in storage unit 240. The list consists of sets of an identifier of a developer and an identifier (for example, an email address or telephone number) of at least one mobile communication terminal 30, which is a destination. When the server program receives a request to upload a file, the program identifies destinations corresponding to a parameter "user" included in the request by referring to the list stored in storage unit 240. Subsequently, the server program transmits an email message including a character string indicating a URL to mobile communication terminals 30, which are the destinations. According to the present modification, it is possible to request a large number of users to carry out an operation test of a program easily as compared with a case where data including a URL is not transmitted.

3-3. Modification 3

A method for determining whether a target platform is a mobile communication terminal is not limited to the method employed in the above embodiment. For example, a developer may specify a platform when compiling is carried out, the development program may carry out compiling in accordance with the specification. Alternatively, the development program may search a source code for a character string indicating that a target platform is a mobile communication terminal, and if the program finds the character string, the program may determine that a target platform is a mobile communication terminal.

3-4. Modification 4

A method of dividing functions between information-processing device 10 and server 20 is not limited to the method employed in the above embodiment. A part of the functions that information-processing device 10 has in the above embodiment may be provided in server 20. Alternatively, a part of the functions that server 20 has in the above embodiment may be provided in information-processing device 10. For example, naming of a file, which is performed by server 20 in the above embodiment, may be performed by information-processing device 10. Also, generation of an image representing a URL, which is performed by information-processing device 10 in the above embodiment, may be performed by server 20. In essence, how functions are divided between information-processing device 10 and server 20 may be arbitrarily determined as long as the functions shown in FIG. 1 are served by information-processing device 10 and server 20.

3-5. Modification 5

A hardware configuration for realizing the functions shown in FIG. 1 is not limited to the hardware configuration described with reference to FIGS. 2 to 5. For example, instead of a general-purpose CPU, a dedicated processor may be used.

In the above embodiment, the program executed by CPU 110, CPU 210, or CPU 310 may be stored in a computer readable recording medium and distributed. A computer readable recording medium may be a magnetic recording medium (e.g., a magnetic tape or a magnetic disk (an HDD or a FD (Flexible Disk))), an optical recording medium (e.g., an optical disk (a CD (Compact Disk) or a DVD (Digital Versatile Disk))), a magnetic optical recording medium, or a semiconductor memory (Flash ROM). Alternatively, the program may be downloaded over a network such as the Internet.

What is claimed is:
1. An information-processing device comprising:
a storage unit that stores first location data for identifying a server on a network, and an application development program;
a processor that converts a source code into an object code;
a transmitting unit that, upon detecting that an object code to be generated by the processor is directed to a mobile communication terminal, transmits a request to upload a file, including an object code generated by the processor, to the server identified by the first location data stored in the storage unit over the network;
a receiving unit that receives a response to the request transmitted from the server; and
a control unit that, in response to receipt by the receiving unit of the response, causes a display unit that displays information to display a screen showing second location data indicating a location of the file on the network, the screen being read by a camera.

2. An information-processing device according to claim 1, wherein:
the second location data includes a character string identifying an ordinal number that is determined on a created date of the file; and
the screen includes a first part that shows the second location data corresponding to the file and a second part that shows an ordinal number corresponding to another file.

3. An information-processing device according to claim 1, wherein:
The processor converts a source code into plural object codes, which correspond to different models of the mobile communication terminal;
the request is a request to upload plural files corresponding to plural object codes;
the second location data includes a character string identifying a model of the mobile communication terminal; and
the screen includes a first part that shows the second location data corresponding to the file and a second part that shows the model corresponding to another file.

4. An information-processing device according to claim 2, wherein:
the second part shows an image of plural tabs that correspond to different files;
the information-processing device comprises an accepting unit that accepts an instruction to select one from among the plural tabs; and
the control unit causes the display unit to display a screen that includes a first part that shows second location data corresponding to a file corresponding to a tab selected by an instruction accepted by the accepting unit, and a second part that shows an image of tabs corresponding to files other than the file corresponding to the selected tab.

5. An information-processing device according to claim 1, wherein:
the storage unit stores an identifier that shows whether an object code is directed to the mobile communication terminal;
the information-processing device comprises a determination unit that determines whether an object code to be generated by the processor is directed to the mobile communication terminal on the basis of the identifier retrieved from the storage unit; and
in response to determination by the determination unit determines that an object code to be generated by the processor is directed to the mobile communication terminal, the transmitting unit transmits the request.

6. A communication system comprising:
a server;
an information-processing device connected to the server over a network; and
a mobile communication terminal connected to the server over the network, wherein:
the information-processing device comprises:
a first storage unit that stores first location data for identifying a server on the network, and an application development program;
a first processor that converts a source code into an object code; and
a first transmitting unit that, upon detecting that an object code to be generated by the first processor is directed to a mobile communication terminal, transmits a request to upload a file, including an object code generated by the first processor, to the server identified by the first location data stored in the first storage unit over the network,
the server comprises:
a first receiving unit that receives a file transmitted from the information-processing device;
a second processor that gives a file name to a file received by the first receiving unit;
a second storage unit that stores a file to which a file name has been given by the second processor; and
a second transmitting unit that, in response to storage of the file in the second storage unit, transmits a response to the request, including second location data indicating a location of the file on the network, to the information-processing device,
the information-processing device further comprises:
a second receiving unit that receives a response to the request, transmitted from the server; and
a control unit that, in response to receipt by the second receiving unit of the response, causes a display unit that displays information to display a screen showing the second location data,
the mobile communication terminal comprises:
a reading unit that reads the screen displayed on the display unit, the reading unit being a camera;
an obtaining unit that obtains the file, using the second location data shown on the screen, read by the reading unit; and
an executing unit that executes an object code included in the file obtained by the obtaining unit.

7. A communication system according to claim 6, wherein:
the server comprises a generating unit that generates data of an image representing the second location data, on the basis of the file name; and
the second transmitting unit transmits the data generated by the generating unit to the mobile communication terminal.

8. A non-transitory computer readable medium storing a program for causing an information-processing device comprising a storage unit that stores first location data for identifying a server on a network, and an application development program, and a control unit that controls a display unit that displays information, to:
convert a source code into an object code;
upon detecting that an object code to be generated by conversion is directed to a mobile communication terminal, transmit a request to upload a file, including an object code generated by conversion, to the server identified by the first location data stored in the storage unit over the network;
receive a response to the request transmitted from the server; and
upon receiving the response, cause the display unit to display a screen showing second location data indicating a location of the file on the network, the screen being read by a camera.

9. An information-processing method carried out by an information-processing device comprising a storage unit that stores first location data for identifying a server on a network, and an application development program, and a control unit that controls a display unit that displays information, the method comprising:
converting a source code into an object code;
upon detecting that an object code to be generated by conversion is directed to a mobile communication terminal, transmitting a request to upload a file, including an object code generated by conversion, to the server identified by the first location data stored in the storage unit over the network;

receiving a response to the request transmitted from the server; and upon receiving the response, causing the display unit to display a screen showing second location data indicating a location of the file on the network, the screen being read by a camera.

* * * * *